(12) United States Patent
Kang

(10) Patent No.: US 10,334,590 B2
(45) Date of Patent: Jun. 25, 2019

(54) APPARATUS AND METHOD FOR SETTING WIRELESS MESH NETWORK AND COMPUTER-READABLE RECORDING MEDIUM

(71) Applicant: SK Planet Co., Ltd., Seongnam-si, Gyeonggi-do (KR)

(72) Inventor: Kichon Kang, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 147 days.

(21) Appl. No.: 15/289,969

(22) Filed: Oct. 11, 2016

(65) Prior Publication Data

US 2017/0118754 A1  Apr. 27, 2017

(30) Foreign Application Priority Data

Oct. 27, 2015  (KR) .................. 10-2015-0149221

(51) Int. Cl.
*H04W 72/04* (2009.01)
*H04W 72/08* (2009.01)
*H04W 8/00* (2009.01)
*H04W 84/18* (2009.01)

(52) U.S. Cl.
CPC ....... *H04W 72/0446* (2013.01); *H04W 8/005* (2013.01); *H04W 72/082* (2013.01); *H04W 72/0453* (2013.01); *H04W 72/0486* (2013.01); *H04W 84/18* (2013.01)

(58) Field of Classification Search
CPC ............. H04W 72/0446; H04W 72/08; H04W 72/0453; H04W 72/082; H04W 84/18; H04W 10/15
See application file for complete search history.

(56) References Cited

U.S. PATENT DOCUMENTS

| | | | | |
|---|---|---|---|---|
| 8,605,693 | B2* | 12/2013 | So ..................... | H04W 12/06 370/338 |
| 2010/0111066 | A1* | 5/2010 | Mehta ............... | H04W 52/0216 370/345 |
| 2013/0094440 | A1* | 4/2013 | Moshfeghi ........... | H04W 88/06 370/328 |
| 2017/0142750 | A1* | 5/2017 | Lee ..................... | H04W 74/006 |

FOREIGN PATENT DOCUMENTS

KR  1020090087178 B1  8/2009

* cited by examiner

*Primary Examiner* — Wei Zhao
(74) *Attorney, Agent, or Firm* — Brinks Gilson & Lione

(57) ABSTRACT

The present invention relates to an apparatus and method for setting a wireless mesh network and a computer-readable recording medium storing a program for carrying out the method, and more particularly, to an apparatus and method for preventing interference between beacon devices by setting different channels for the beacon devices and distributing different time slots to the beacon devices, and a computer-readable recording medium storing a program for carrying out the method.

16 Claims, 9 Drawing Sheets

APPARATUS AND METHOD FOR SETTING WIRELESS MESH NETWORK AND COMPUTER-READABLE RECORDING MEDIUM

CROSS-REFERENCE TO RELATED APPLICATION

This application claims priority to and the benefit of Korean Patent Application No. 10-2015-0149221 filed in the Korean Intellectual Property Office on Oct. 27, 2015 the entire contents of which are incorporated herein by reference.

TECHNICAL FIELD

The present invention relates to an apparatus and method for setting a wireless mesh network and a computer-readable recording medium storing a program for carrying out the method, and more particularly, to an apparatus and method for preventing interference between beacon devices by setting different channels for the beacon devices and distributing different time slots to the beacon devices, and a computer-readable recording medium storing a program for carrying out the method.

BACKGROUND

Descriptions made in this section merely provide background information of embodiments of the present invention and do not constitute conventional art.

In general, a wireless network has a point-to-point topology or a star, that is, point-to-multipoint, topology, but a wireless network which has a mesh, that is, multipoint-to-multipoint, structure like a wired network has been attracting attention recently.

A wireless mesh network may be easily extended without connection to a wired network and has resultant merits in flexibility and extendability, such as speed and economic efficiency in network establishment, redundancy provided by multiple paths, and so on.

In an existing wired network environment, a signal is connected through a repeater or a wireless router referred to as an access point (AP), and all APs are connected in a wired manner.

On the other hand, in a mesh network, wireless communication routers which will serve as antennas like existing wireless communication base stations (BSs) become mesh nodes and wirelessly connect all sections as long as a representative AP is connected in a wired manner. In this way, the structure of a wired mesh network may also be implemented in a wireless network. Thus, a mesh network which overcomes a limitation of an existing wireless local area network (WLAN), has appeared.

Also, with the development of mobile communication networks and specifications of terminals, a mobile communication terminal has gone beyond the existing scope of a simple communication device or information providing device to become a necessary possession of contemporary people, and is evolving into a total entertainment device.

Further, technologies for performing short-range wireless communication between mobile communication terminals close to each other are rapidly developing, and one of the short-range wireless communication technologies is Bluetooth communication.

Bluetooth communication has evolved again and again, and the Bluetooth low energy (BLE) technology (Bluetooth 4.0) is widely being used in smart phones, retail geofencing, mobile payment, and so on. The BLE technology consumes less power than a standard Bluetooth wireless connection.

Also, there is ongoing development of a service method for providing various types of information to a mobile communication terminal of a user using a beacon which uses Bluetooth communication, and cases of constructing a mesh network using a beacon device which uses Bluetooth communication are increasing.

In such a wireless mesh network, when there are a plurality of beacon devices forming the mesh network and the beacon devices simultaneously transmit beacon signals through the same channel, the beacon devices may interfere with each other's signals.

Consequently, a method of efficiently adjusting a network setting is required so that beacon signals are transmitted while interference between adjacent beacon devices is prevented.

CITATION LIST

Patent Literature

Korean Patent No. 10-1444324, registered on Sep. 18, 2014 (title: Apparatus and Method for Controlling Effects of Interference in Wireless Communication System)

SUMMARY

The present invention is directed to providing a method of setting a wireless mesh network in which first beacon devices are connected in a tree topology, channels for signals simultaneously transmitted by a parent node and a child node are differently set, and a first beacon device divides a time slot into as many time slots as the number of second beacon devices connected to the first beacon device and distributes the signals to the second beacon devices, so that the problem of collision may be prevented.

More specifically, the present invention is directed to providing an apparatus and method for setting a wireless mesh network wherein a plurality of first beacon devices are connected in a tree topology, one or more second beacon devices are connected to each of the plurality of first beacon devices, a first beacon device is allocated a usable frequency different from a usable frequency of another first beacon device close to the first beacon device among preset usable frequencies, and different usable times are defined and allocated to respective second beacon devices when a usable frequency allocated to the first beacon device is transmitted.

Technical objects to be achieved in the present invention are not limited to those mentioned above, and other unmentioned technical objects will be obviously understood by those or ordinary skill in the art from the description below.

One aspect of the present invention provides a method of setting a wireless mesh network, the method including: connecting a plurality of first beacon devices in a tree topology; allocating a plurality of preset usable frequencies as communication channels for the plurality of first beacon devices connected in the tree topology; connecting one or more second beacon devices to at least one of the plurality of first beacon devices connected in the tree topology; and allocating the one or more second beacon devices time slots for defining usable times of a usable frequency allocated to the at least one first beacon device connected in a higher layer than the one or more second beacon devices.

Another aspect of the present invention provides a first beacon device including: a first communication unit configured to connect with one or more other first beacon devices in a tree topology; a second communication unit configured to connect with one or more second beacon devices; and a controller configured to control a beacon signal, wherein the controller allocates one of preset usable frequencies as a communication channel for the one or more first beacon devices connected in the tree topology and allocates the one or more second beacon devices time slots for defining usable times of the usable frequency allocated to the first beacon devices.

Still another aspect of the present invention provides a computer-readable recording medium storing a program for carrying out the above-described method of setting a wireless mesh network.

According to the method of setting a wireless mesh network of the present invention, by preventing interference between signals transmitted from respective beacon devices when establishing a mesh network, it is possible to reduce information errors caused by interference occurring when a mobile communication terminal of a user receives a beacon signal or beacon devices exchange signals with each other.

Also, according to the present invention, it is possible to establish a wireless mesh network having resultant flexibility and extendability, such as speed and economic efficiency in network establishment, redundancy based on multiple paths, etc., without worrying about interference, connect the wireless network to a representative access point (AP) in a wired manner so that beacon devices which will serve as antennas like existing wireless communication base stations (BSs) become mesh nodes and wirelessly connect all sections, and implement the structure of a wired mesh network in even a wireless network so that a limitation of an existing wireless local area network (WLAN) may be overcome.

The effects of the present invention are not limited to the aforementioned effects, and other effects, which are not mentioned above, will be apparent to those of ordinary skill in the art to which the present invention pertains from the description below.

DETAILED DESCRIPTION

Figure 1:
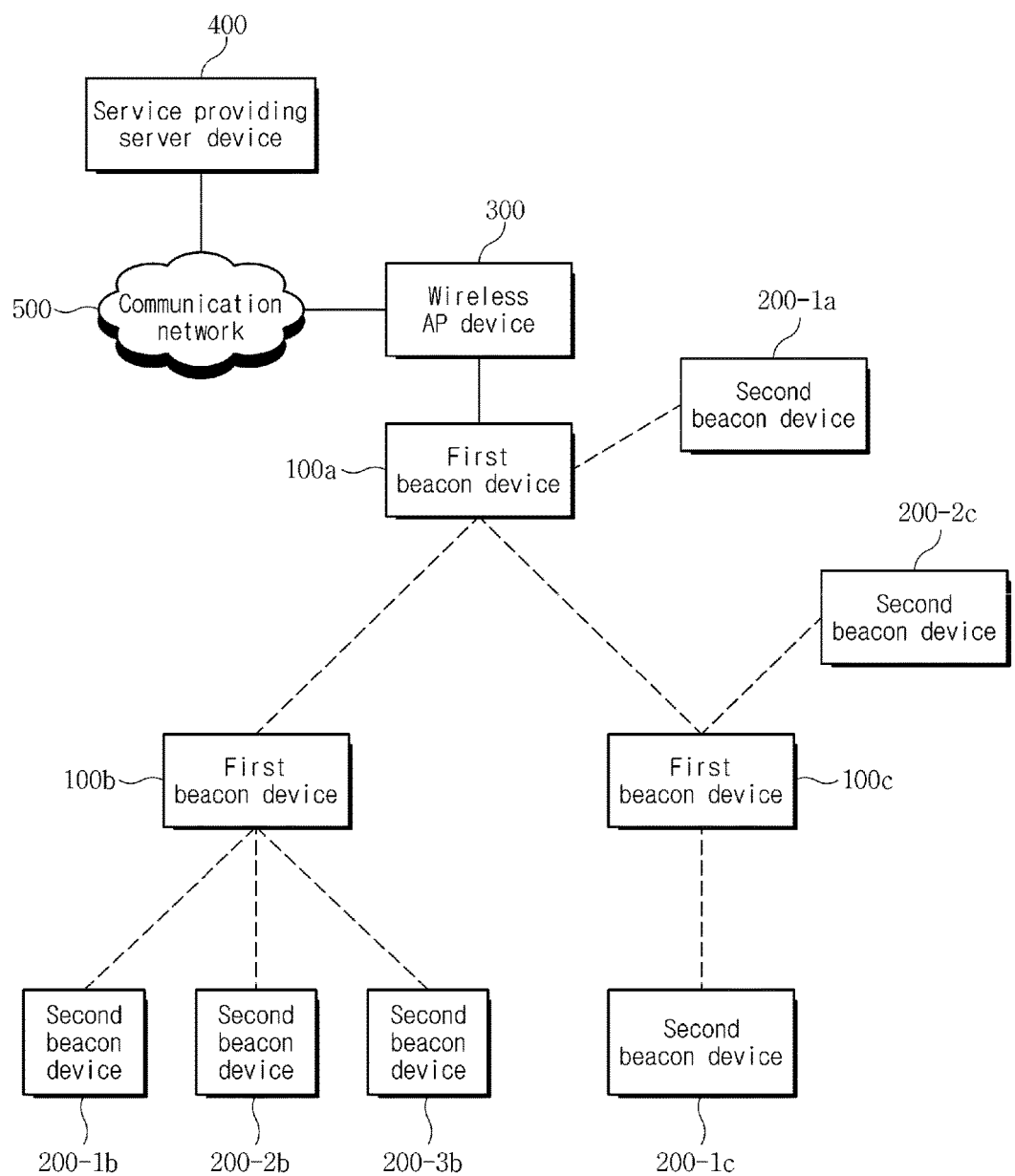
FIG. 1 is a block diagram schematically showing an overall system which carries out a method of setting a wireless mesh network according to an embodiment of the present invention.

Embodiments of the present invention will now be described more fully with reference to the accompanying drawings to clarify features and advantages of the present invention.

In the detailed description of embodiments of the present invention, when detailed descriptions on the known art related to the present invention are determined to obscure the subject matter of the present invention, the detailed descriptions will be omitted. Throughout the drawings, like elements are noted by like numerals as much as possible.

Terms or words used in this specification and claims described below are not to be construed as common or dictionary meanings but are to be construed as meanings and concepts in accordance with the technical spirit of the present invention based on a principle that the inventor can define terms appropriately for best explaining his or her own invention.

Embodiments described in the present specification and configurations shown in the drawings are merely exemplary embodiments of the present invention and do not represent the whole technical spirit of the present invention. Thus, it is to be understood that there can be various equivalents and modifications at the filing date of the present invention.

Although terms including ordinal numbers, such as "first," " "second," etc., may be used to describe various components, the components should not be defined by such terms. Such terms are used only for the purpose of distinguishing one component from another component. For example, a first component may be designated a second component without departing from the scope of the present invention and, similarly, the second component may also be designated the first component.

It will be understood that when a component is referred to as being "connected" or "coupled" to another component, the component can be logically or physically connected or coupled to the other component. In other words, the component may be connected or coupled to the other component directly or indirectly, or intervening components may be present.

The terminology used herein to describe embodiments of the invention is not intended to limit the scope of the invention. Elements of the invention referred to in the singular may number one or more, unless the context clearly indicates otherwise.

It will be further understood that the terms "comprise," "include," etc., when used herein, specify the presence of stated features, numbers, steps, operations, components, parts, or combinations thereof, but do not preclude the presence or addition of one or more other features, numbers, steps, operations, components, parts, or combinations thereof.

Also, the terms " . . . unit," " . . . er," "module," etc. used herein indicate units for processing at least one function or operation and may be implemented by hardware, software, or combinations thereof.

Further, the singular forms "a," "an," "one," "the," etc. include plural referents unless the context (particularly in the context of the claims) clearly dictates otherwise.

Embodiments of the present invention include a computer-readable medium which has computer-executable instructions or has or transfers a data structure stored therein. The computer-readable medium may be any available medium which is accessible by a general or special purpose computer system.

For example, the computer-readable medium may include a physical storage medium, such as a random access memory (RAM), a read-only memory (ROM), an erasable programmable ROM (EPROM), a compact disc ROM (CD-ROM), other optical disk storage devices, a magnetic disk storage device, other magnetic storage devices, or any other medium which may be used to store and transfer a certain program code means having the form of computer-executable instructions, computer-readable instructions, or data structures and may be accessed by a general or special purpose computer system, but is not limited thereto.

In the following descriptions and claims, a "network" is defined as one or more data links that enable transmission of electronic data between computer systems and/or modules. When information is transmitted or provided to a computer system through a network or another (wired, wireless, or a combination thereof) communication connection, the connection may be understood as a computer-readable medium.

Computer-readable instructions include, for example, instructions and data which cause a general-purpose computer system or a special-purpose computer system to perform a specific function or a group of functions. Computer-executable instructions may be, for example, binaries, intermediate format instructions such as an assembly language, or even source code.

Embodiments of the present invention may be implemented in a network computing environment with various types of computer system configurations including personal computers (PCs), laptop computers, handheld devices, multiprocessor systems, microprocessor-based or programmable consumer electronics, network PCs, minicomputers, mainframe computers, mobile telephones, personal digital assistants (PDAs), pagers, and so on. The present invention may also be implemented in a distributed system environment in which both local and remote computer systems linked by a wired data link, a wireless data link, or a combination thereof through a network perform tasks. In a distributed system environment, program modules may be located in both local and remote memory storage devices.

A method of setting a wireless network using the beacon technology according to the present invention will be described based on the Bluetooth low energy (BLE) data communication technology.

While near field communication (NFC) is limitedly usable within tens of centimeters only, Bluetooth communication may be used within tens of meters and thus is applied to far more fields. In particular, according to Bluetooth communication, it is possible to transfer data just by passing through a place in which a beacon device is installed without having to draw a device close to a reader and tag the device like NFC, and also possible to read the detailed positional movement of a user in a building and transfer customized data.

However, a method of setting a wireless mesh network according to the present invention is not limited to BLE or Bluetooth, and various personal area network (PAN)-based short-range communication technologies including Zigbee, ultra-wideband (UWB), ANT, wireless fidelity (Wi-Fi), NFC, etc. may be applied thereto.

Hereinafter, a method of setting a wireless mesh network and a computer-readable recording medium storing a program for carrying out the method according to exemplary embodiments of the present invention will be described in detail with reference to drawings.

First, a system for setting a wireless mesh network according to an embodiment of the present invention will be described.

FIG. 1 is a block diagram schematically showing an overall system which carries out a method of setting a wireless mesh network according to an embodiment of the present invention.

As shown in FIG. 1, the system for setting a wireless mesh network according to an embodiment of the present invention may include a first beacon device 100, a second beacon device 200, a wireless access point (AP) device 300, a service providing server device 400, and a communication network 500 connecting them.

In FIG. 1, components connected through a solid line may be connected in a wired or wireless communication manner but are preferably connected in a wired communication manner while components connected through a dotted line are connected through a wireless communication manner.

Both the first beacon device 100 and the second beacon device 200 may be plural in number, and the second beacon devices 200 are under management of the first beacon devices 100. A first beacon device 100a may be connected to other first beacon devices 100b and 100c in a tree topology. The first beacon device 100a is connected to the wireless AP device 300 to be connected to a wired network. The first beacon device 100a connected to the wireless AP device 300 may be another first beacon device 100b or 100c, and a plurality of first beacon devices 100a may also be connected to one or more wireless AP devices 300.

Each first beacon device 100 does not necessarily manage one second beacon device 200 and may manage a plurality of second beacon devices 200. Referring to FIG. 1, the first beacon device 100a manages one second beacon device 200-1a, the first beacon device 100b manages three second beacon devices 200-1b, 200-2b, and 200-3b, and the first beacon device 100c manages two second beacon devices 200-1c and 200-2c.

The first beacon devices 100 may be connected to the second beacon devices 200 through pairing and bonding. The plurality of second beacon devices 200 may be connected to the first beacon devices 100 in a star topology.

As for the beacon devices, the plurality of first beacon devices 100 and the plurality of second beacon devices 200 denote devices which are installed at certain locations for a general beacon service and periodically transmit beacon signals. Here, the beacon signals may include unique identification information assigned to the first beacon devices 100 and the second beacon devices 200 or beacon identification information, such as location information, etc., and the beacon identification information becomes a basis on which a user terminal device (not shown) is provided with the beacon service.

In case of a BLE beacon, beacon identification information may be unique values of the BLE beacon including a universally unique identifier (UUID), a major/minor version, and a signal intensity.

In case of a Wi-Fi beacon, identification information may be Wi-Fi-specific unique values including a basic service set identifier (BSSID), a frequency, and a signal intensity. A BSSID denotes a 48-bit identifier or a network ID for identifying a basic service set according to the wireless local area network (WLAN) standard 802.11. In general, a BSSID denotes the media access control (MAC) address of AP equipment and is generated as a random value in the case of an independent BSS or an ad-hoc network.

Although BLE and Wi-Fi are used as examples, wireless communication methods of the first beacon devices 100 and the second beacon devices 200 according to an embodiment of the present invention are not limited to BLE and Wi-Fi as mentioned above.

In particular, in the present invention, the first beacon devices 100 are connected to the second beacon devices 200 through a short-range communication network (PAN) and manage and control the second beacon devices 200 by transmitting certain command messages or request messages to the second beacon devices 200.

Here, one first beacon device 100 is not necessarily connected to one second beacon device 200 for management. One first beacon device 100 may manage a plurality of second beacon devices 200 and may be connected to another first beacon device 100 through the short-range communication network (PAN). Here, the short-range communication method between the first beacon devices 100 and the short-range communication method between the first beacon device 100 and the second beacon devices 200 may be configured or employed differently from each other to implement the present invention.

Configurations of the first beacon devices 100 and the second beacon devices 200 according to an embodiment of the present invention will be described in detail below.

The wireless AP device 300 may be connected to the first beacon devices 100 and may cause wirelessly connected beacon devices to be connected to the communication network 500 and make it possible to implement a wireless network in the same structure as a wired mesh network.

The service providing server device 400 is a component for providing a service to a user through a network, and may receive a packet for a requested service from the user terminal device (not shown) and transmit a response packet to the user terminal device (not shown) which has transmitted the packet in response to the received packet. Also, the service providing server device 400 may control the first beacon devices 100 and the second beacon devices 200 through the communication network 500.

The service providing server device 400 may be a web application server (WAS), an Internet information server (IIS), or a web server or a cache server using Apache Tomcat or NGINX. Besides them, one of the devices mentioned as examples constituting a network computing environment may be the service providing server device 400 according to an embodiment of the present invention. Also, the service providing server device 400 supports an operating system (OS), such as Linux, Windows, etc., and may execute a received control command. In a software manner, the service providing server device 400 may include a program module which is implemented using a language, such as C, C++, Java, Visual Basic, Visual C, or so on.

In addition, the service providing server device 400 of the present invention operates in conjunction with the wireless AP device 300 for implementing the present invention through the communication network 500, and the communication network 500 denotes a network, such as an Internet network, an intranet, a mobile communication network, a satellite communication network, etc., in which data may be transmitted and received according to the Internet protocol (IP) using various wired and wireless communication technologies. Also, the communication network 500 stores computing resources including hardware, software, etc. in combination with the service providing server device 400, the user terminal device (not shown), or the wireless AP device 300. The concept of the communication network 500 collectively includes closed networks including a LAN, a wide area network (WAN), etc., open networks including the Internet, networks including a code division multiple access (CDMA) network, a wideband CDMA (WCDMA) network, a global system for mobile communications (GSM) network, a Long Term Evolution (LTE) network, an evolved packet core (EPC) network, etc., a next-generation network which will be implemented in the future, and a computing network.

The communication network 500 of the present invention includes, for example, a plurality of access networks (not shown) and a core network (not shown), and may include an external network, for example, an Internet network (not shown). In the access networks (not shown), wired and wireless communication are performed through the load distribution devices 100 and the gateway device 300, and the access networks may be implemented with, for example, a plurality of base stations (BSs), such as a base transceiver station (BTS), a node BS (NodeB), an evolved NodeB (eNodeB), etc., and a BS controller (BSC), such as a radio network controller (RNC). Also, as mentioned above, digital signal processors and wireless signal processors integrally implemented in the BSs may be respectively classified into digital units (DUs) and radio units (RUs), and the plurality of RUs (not shown) may be separately installed in a plurality of areas and connected to the centralized DUs (not shown), so that the access networks may be configured.

The core network (not shown) which constitutes a mobile network together with the access networks (not shown) serves to connect the access networks (not shown) to an external network, for example, an Internet network (not shown).

As mentioned above, the core network (not shown) is a network system which performs main functions, such as mobility control, switching, etc. between the access networks (not shown), for a mobile communication service. The core network (not shown) performs circuit switching or packet switching and manages and controls packet flow in the mobile network. Also, the core network (not shown) may manage mobility between frequencies and play a role in interworking traffic in the access networks (not shown), the core network (not shown), and another network, for example, an Internet network (not shown). The core network (not shown) may include a serving gateway (SGW), a packet data network (PDN) gateway (PGW), a mobile switching center (MSC), a home location register (HLR), a mobile mobility entity (MME), a home subscriber server (HSS), and so on.

The Internet network (not shown) denotes a general open communication network in which information is exchanged according to transmission control protocol (TCP)/IP, that is, a public network. The Internet network (not shown) is connected to the service providing server device 400, and may provide a service provided by the service providing server device 400 to the user terminal device (not shown)

through the core network (not shown) and an access network (not shown) and provide service request information transmitted from the user terminal device (not shown) to the service providing server device 400 through the core network (not shown) and the access network (not shown). Also, the Internet network (not shown) may connect the service providing server device 400 and the wireless AP device 300, thereby making it possible to provide a service using a beacon device.

The user terminal device (not shown) denotes a device of the user which may transmit and receive various types of data through the communication network 500 according to manipulation of the user. Here, the term "user terminal device" may be replaced with the terms "user equipment (UE)," "mobile station (MS)," "mobile subscriber station (MSS)," "subscriber station (SS)," "advanced mobile station (AMS)," "wireless terminal (WT)," "machine-type communication (MTC) device," "machine-to-machine (M2M) device," "device-to-device (D2D) device," "station (STA)," and so on. Units equivalent to the aforementioned units may be used as the user terminal device (not shown) according to the present invention.

For example, the user terminal device (not shown) mentioned in this specification may be a fixed terminal, such as a smart television (TV), a desktop computer, etc., as well as a mobile terminal, such as a smart phone, a tablet PC, a PDA, a portable multimedia player (PMP), a Motion Picture Experts Group (MPEG) audio layer-3 (MP3) player, etc.

A processor installed in each device according to an embodiment of the present invention may process a program command for carrying out the method according to the present invention. In an embodiment, the processor may be a single-threaded processor, and in another embodiment, the processor may be a multithreaded processor. Further, the processor may process a command stored in a memory or a storage device.

In the method of setting a wireless mesh network according to the system structure of FIG. 1, a communication method between the first beacon devices 100 will be described in detail below.

Figure 2:
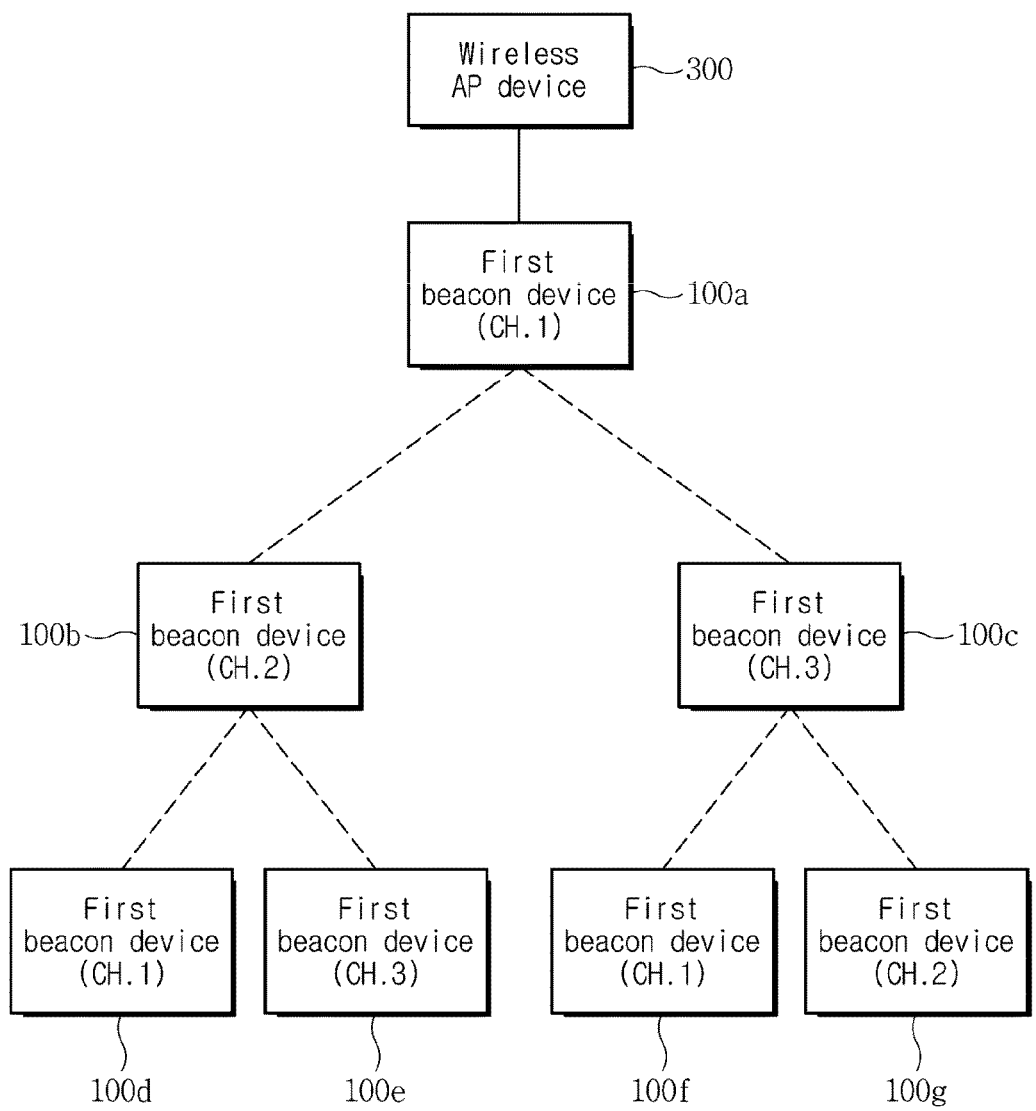
FIG. 2 is a block diagram showing results of allocating usable frequencies to first beacon devices using the method of setting a wireless mesh network according to an embodiment of the present invention.

FIG. 2 is a block diagram showing results of allocating usable frequencies to the first beacon devices 100 using the method of setting a wireless mesh network according to an embodiment of the present invention.

FIG. 2 shows results of allocating usable frequencies according to hierarchical level without considering the actual locations of the first beacon devices 100.

Here, when a particular first beacon device 100 is considered as a basis, a first beacon device 100 which is located in a closer stage than the particular first beacon device 100 to the wireless AP device 300 in a connection operation is defined to be in a higher layer. On the other hand, a first beacon device 100 which is located in a farther stage than the particular first beacon device 100 is defined to be in a lower layer.

Also, a first beacon device 100 existing in a higher layer than another first beacon device 100 among first beacon devices 100 connected to the other first beacon device 100 is referred to as a parent node, a first beacon device 100 existing in a lower layer than the other first beacon device 100 among the first beacon devices 100 connected to the other first beacon device 100 is referred to as a child node, and first beacon devices 100 existing in the same layer as the other first beacon device 100, that is, child nodes of the parent node of the other first beacon device 100, are referred to as sibling nodes excluding the other first beacon device 100.

Referring to FIG. 2, the first beacon device 100a in a first layer is connected to the wireless AP device 300. The other first beacon devices 100b and 100c are connected to the first beacon device 100a in a tree topology, and each of other first beacon devices 100d, 100e, 100f, and 100g is connected to either of the first beacon devices 100b and 100c in a second layer. As an example, description will be made based on a binary tree topology in which the single first beacon device 100a is connected to the two first beacon devices 100b and 100c in a lower layer thereof, but the tree topology is not necessarily set to a binary tree topology. When a communication method used by the first beacon devices 100 is determined, it is possible to determine the maximum number of connectable first beacon devices 100 according to the number of frequency channels allocable in the communication method.

"CH.1" in brackets denotes an arbitrary usable frequency allocated to the first beacon device 100a. The first beacon devices 100 may select an arbitrary first wireless communication protocol for communicating with each other and select a different second wireless communication protocol for communicating with the second beacon devices 200. When the second wireless communication protocol supports three frequencies, the three frequencies are referred to as "channel 1 (CH.1)," "channel 2 (CH.2)," and "channel 3 (CH.3)" herein.

The first wireless communication protocol and the second wireless communication protocol may be identical or different from each other, but preferably differ from each other to avoid interference. A usable frequency allocated to each first beacon device 100 is based on the second wireless communication protocol.

When the usable frequency of channel 1 is allocated to the first beacon device 100a and also is allocated to the first beacon devices 100b and 100c connected to the first beacon device 100a, interference may occur between the adjacent first beacon devices 100a, 100b, and 100c. When communication interference occurs, a problem may occur in providing a service due to interruption of information transfer and crosstalk.

To avoid this, the first beacon devices 100b and 100c are allocated the usable frequencies of channels different from that of the first beacon device 100a. For example, the first beacon device 100b may be allocated the usable frequency of channel 2, and the first beacon device 100c may be allocated the usable frequency of channel 3. Although the usable frequency of the same channel other than channel 1 may be allocated to the first beacon devices 100b and 100c, it is highly likely that the first beacon devices 100b and 100c in the same layer are located close to each other, and thus it is preferable to allocate different channels.

When the first beacon device 100b is connected to the other first beacon devices 100d and 100e in a lower layer, the first beacon devices 100d and 100e are respectively allocated the usable frequencies of channel 1 and channel 3 different from channel 2 allocated to the first beacon device 100b to avoid interference.

Here, usable frequencies are randomly allocated to sibling nodes, but allocation of usable frequencies in which the actual locations of first beacon devices 100 are considered will be described below.

Figure 3:
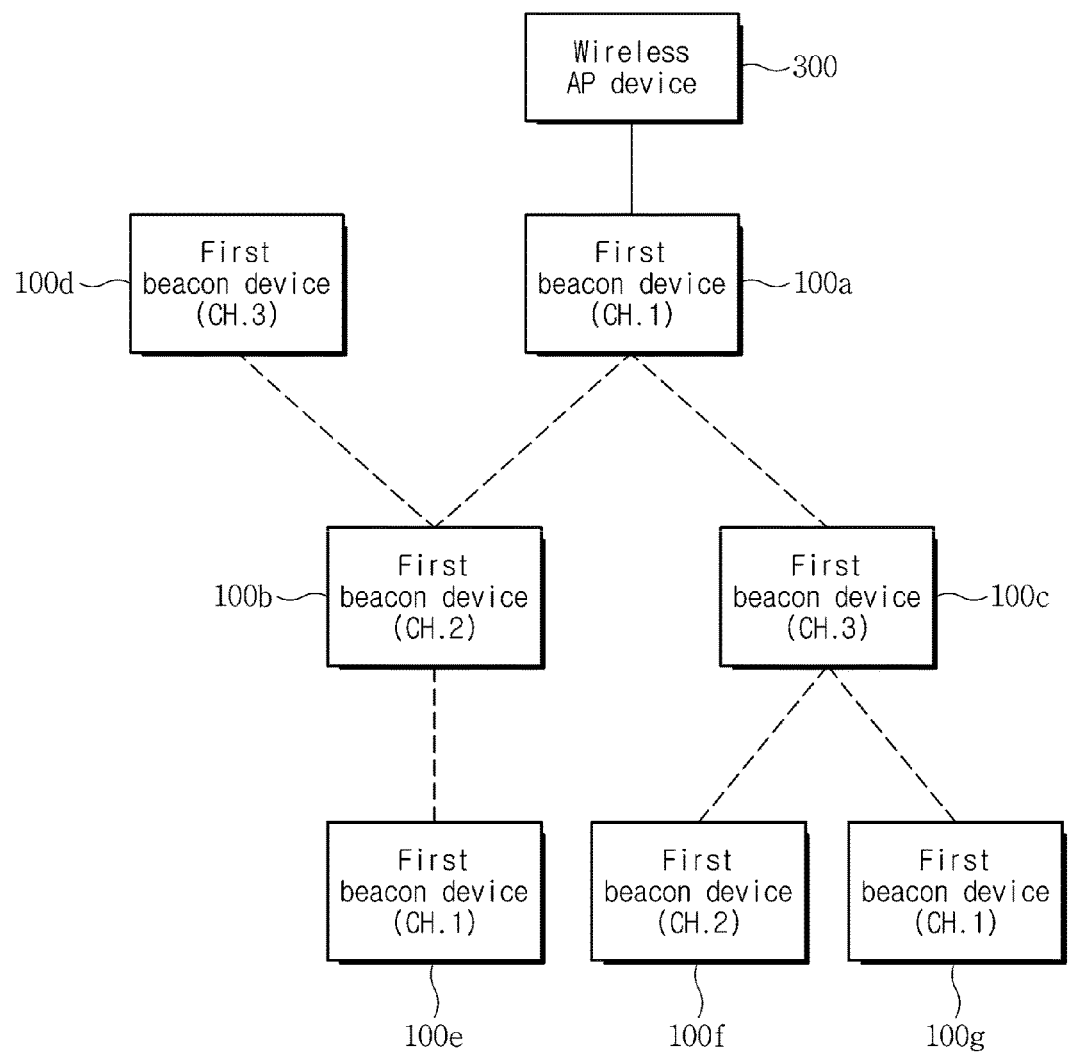
FIG. 3 is an example diagram showing results of allocating usable frequencies to first beacon devices using the method of setting a wireless mesh network according to an embodiment of the present invention by considering the locations of the first beacon devices.

FIG. 3 is an example diagram showing results of allocating usable frequencies to the first beacon devices 100 using the method of setting a wireless mesh network according to an embodiment of the present invention by considering the locations of the first beacon devices 100.

Referring to FIG. 3, the first beacon device 100a in the first layer is connected to the wireless AP device 300 like in FIG. 2. The other first beacon devices 100b and 100c are connected to the first beacon device 100a in a tree topology, and each of the other first beacon devices 100d, 100e, 100f, and 100g is connected to either of the first beacon devices 100b and 100c in the second layer.

Here, it is possible to know that the first beacon device 100a which is the parent node of the first beacon device 100b and the first beacon device 100d which is one of child nodes are not close in a network structure but the actual locations thereof are close to each other. In this case, when usable frequencies are randomly allocated and the first beacon devices 100a and 100d are likewise allocated the usable frequency of channel 1, interference may occur as described above with reference to FIG. 2 because the actual locations of the two devices are close to each other.

This is undesirable in the present invention relating to the method of setting a wireless network for preventing interference, and thus, when allocating usable frequencies, it is necessary to consider actual locations as well as a network structure.

Accordingly, the close first beacon device 100a may be allocated the usable frequency of channel 3 which differs from the previously allocated usable frequency of channel 1 and the usable frequency of channel 2 allocated to the first beacon device 100b, that is, a child node in the network structure.

The first beacon device 100e located in a different place is allocated the usable frequency of channel 1. Since the first beacon device 100f is close to the first beacon device 100e, allocating the usable frequency of channel 2 rather than the usable frequency of channel 1 is helpful for preventing interference. Therefore, the usable frequency of channel 2 may be allocated.

Location information of each first beacon device 100 may be previously stored in the service providing server device 400. Alternatively, after information on another first beacon device 100 close to each first beacon device 100 is stored, a currently allocated channel of the other first beacon device 100 may be checked based on the information, and a channel to be allocated to the first beacon device 100 may be selected.

Thus far, the communication method between the first beacon devices 100 and the allocation of a usable frequency used in communication with the second beacon devices 200 have been described.

Next, a process of allocating time slots for defining usable times of usable frequencies between a first beacon device 100 and the second beacon devices 200 will be described.

Figure 4:
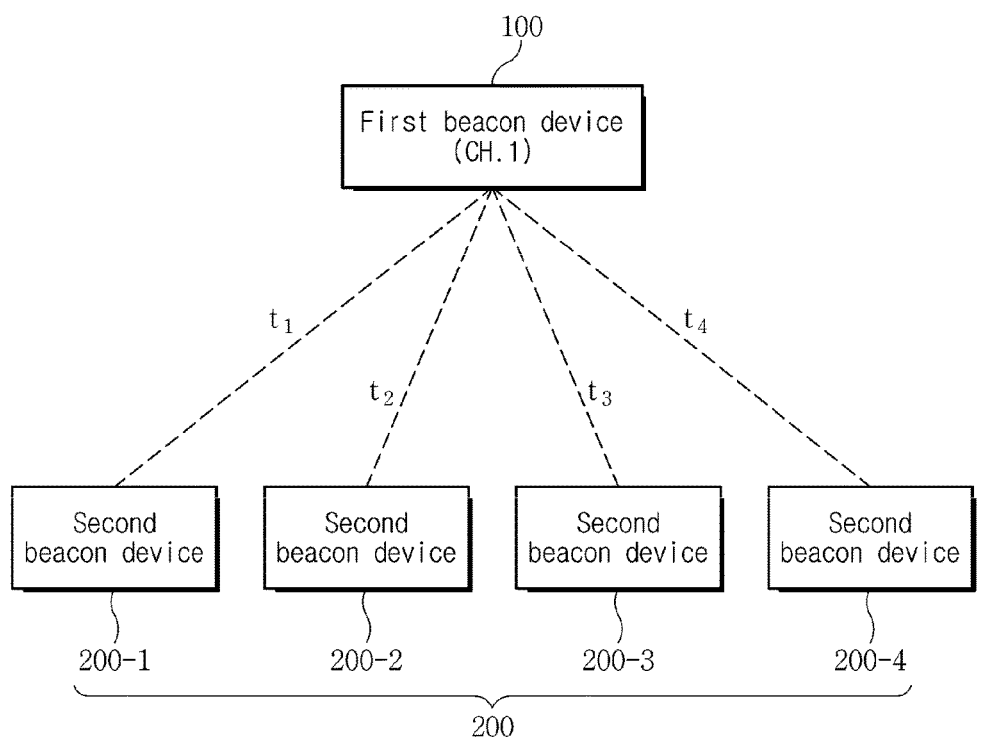
FIG. 4 is a block diagram showing results of allocating a usable frequency to second beacon devices using the method of setting a wireless mesh network according to an embodiment of the present invention.

FIG. 4 is a block diagram showing results of allocating a usable frequency to second beacon devices using the method of setting a wireless mesh network according to an embodiment of the present invention.

Referring to FIG. 4, first, one or more second beacon devices 200 may be connected to a first beacon device 100. The connected first beacon device 100 may correspond to any layer. In other words, the connected first beacon device 100 may be the first beacon device 100a in the first layer connected to the wireless AP device 300 or a first beacon device (not shown) in the last layer. The second beacon devices 200 may be connected to the first beacon device 100 in a star topology.

To prevent interference between the second beacon devices 200 from occurring, the first beacon device 100 distributes a usable frequency allocated thereto to the second beacon devices 200 according to time.

For example, when the usable frequency of channel 1 is allocated to the first beacon device 100, the first beacon device 100 may transmit a signal to second beacon devices 200-1, 200-2, 200-3, and 200-4 using the usable frequency of channel 1 for times t1, t2, t3, and t4, respectively. Here, the values of t1, t2, t3, and t4 may be randomly determined according to a wireless communication method and the user's setting. The values of t1, t2, t3, and t4 are neither necessarily the same nor consecutive. In other words, the values of t1 and t2 may differ from each other, and t2 does not necessarily start when t1 ends. There may be a gap in signal transmission between t1 and t2.

A method of allocating such time slots for defining usable times of a usable frequency will be described in further detail with reference to FIG. 5A and FIG. 5B.

Figure 5A:
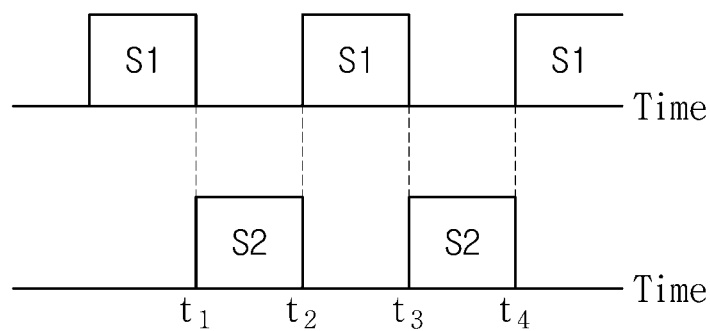
FIG. 5A and FIG. 5B are an example diagram showing time slots of signals transmitted from a first beacon device to second beacon devices using the method of setting a wireless mesh network according to an embodiment of the present invention.
Figure 5B:
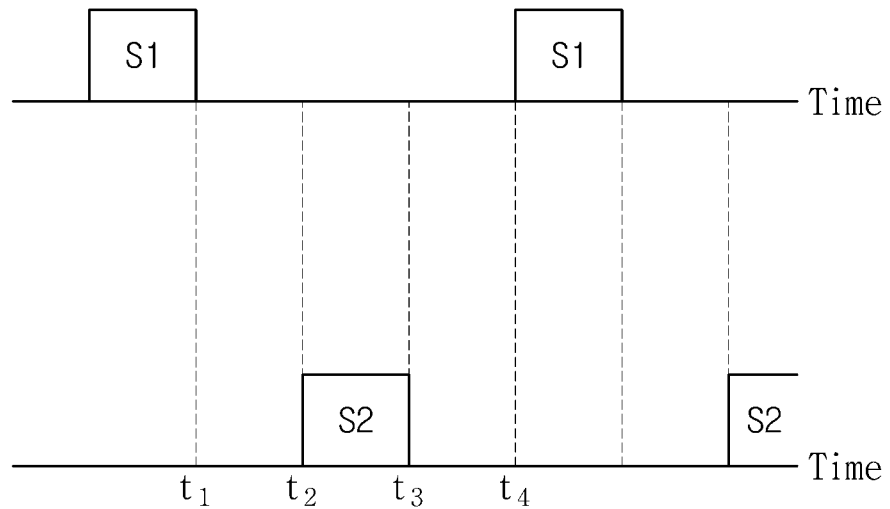

FIG. 5A and FIG. 5B are an example diagram showing time slots of signals transmitted from a first beacon device to second beacon devices using the method of setting a wireless mesh network according to an embodiment of the present invention.

t1, t2, t3, and t4 shown in FIG. 5A and FIG. 5B are times determined according to an embodiment of the present invention. The time t1 in FIG. 5A and the time t1 in FIG. 5B do not denote the same value, and the times t1, t2, t3, and t4 shown in FIG. 5A and FIG. 5B differ from the times t1, t2, t3, and t4 distributed in FIG. 4.

FIG. 5A is a diagram showing an example in which a time slot is divided according to an embodiment of the present invention when there are two second beacon devices 200.

S1 in FIG. 5A denotes a time slot allocated to the second beacon device 200-1, and S2 denotes a time slot allocated to the second beacon device 200-2. Referring to FIG. 5A and FIG. 5B, a usable frequency is allocated to the second beacon device 200-1 for the time t1, and when it becomes the time t1, the usable frequency is allocated to the second beacon device 200-2 for the time between the time t1 and the time t2. When it becomes the time t2 thereafter, the usable frequency is allocated to the second beacon device 200-1 again. In this way, time resources of the same usable frequency are distributed and used.

Here, a detailed method of allocating time slots may be varied.

First, it is possible to set in advance a whole time slot to be allocated to all the second beacon devices 200, divide the whole time slot according to the number of connected second beacon devices 200, and allocate an individual time slot to each second beacon device 200. In other words, the time t2 which is one period of the whole time slot may be set first, and an individual time slot may be set for each second beacon device 200 based on the time t2.

On the other hand, it is also possible to set individual time slots and allocate the usable frequency so that the sum of the individual time slots becomes the whole time slot.

Meanwhile, the second beacon devices 200 may have different processing capacities, or there may be a second beacon device 200 in which traffic is concentrated due to its location.

Considering this, since a second beacon device 200 having a large processing capacity is capable of processing a larger amount of traffic than other second beacon devices 200 during the same time period, a time slot allocated to the second beacon device 200 may be smaller than those allocated to the other second beacon devices 200.

On the other hand, when there is a second beacon device 200 in which traffic is concentrated, the second beacon device 200 requires more resources than other second beacon devices 200 to process the traffic, and thus a time slot allocated to the second beacon device 200 larger than those allocated to the other second beacon devices 200.

In addition, it is possible to leave an idle time between time slots distributed to the second beacon devices 200. The idle time may be set in consideration of traffic in or processing rates of the first beacon devices 100 or whether or not a second beacon device 200 is added.

FIG. 5B shows a case in which there is an idle time between time slots.

Referring to FIG. 5A and FIG. 5B, it is possible to see that a time slot to the time t1 is allocated and an idle time is allocated between the time t1 and the time t2. However, it is not necessary for an idle time to be allocated between all time slots. It is possible to set t2−t1>0 and t4−t3=0, that is, an idle time may be set when the allocation time of the usable frequency is changed from the second beacon device 200-1 to the second beacon device 200-2, but no idle time may be set when the allocation time of the usable frequency is changed from the second beacon device 200-2 to the second beacon device 200-1.

Thus far, allocation of time slots between the first beacon device 100 and the second beacon devices 200 according to an embodiment of the present invention has been described.

Structures of the first beacon devices 100 and the second beacon devices 200 which perform the method of setting a wireless mesh network according to embodiments of the present invention will be described below with reference to FIGS. 6 and 7.

Figure 6:
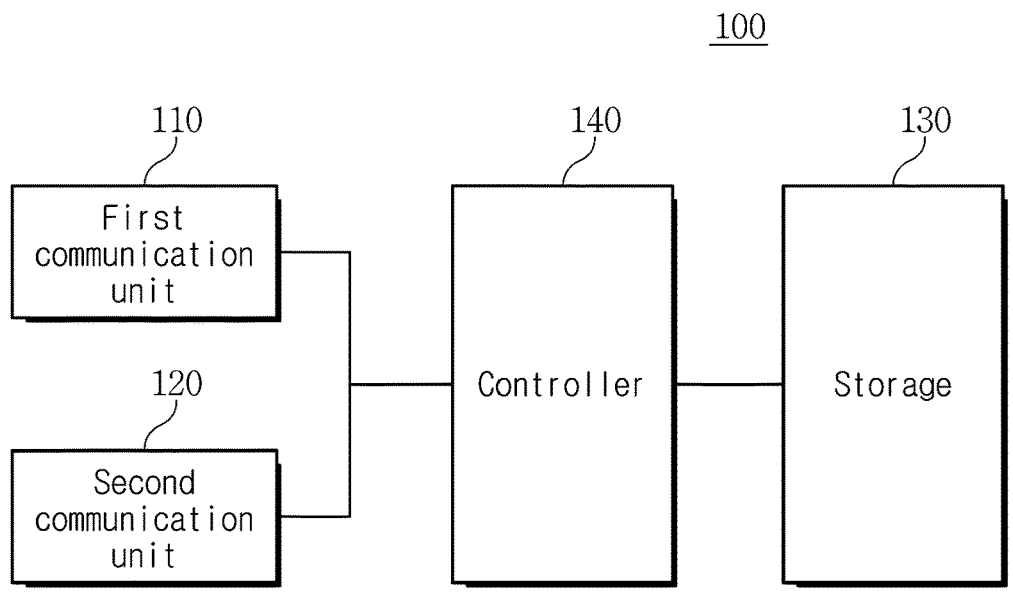
FIG. 6 is a block diagram showing a structure of a first beacon device which carries out the method of setting a wireless mesh network according to an embodiment of the present invention.

FIG. 6 is a block diagram showing a structure of a first beacon device 100 which carries out the method of setting a wireless mesh network according to an embodiment of the present invention.

Referring to FIG. 6, a first beacon device 100 which carries out the method of setting a wireless mesh network according to an embodiment of the present invention may include a first communication unit 110, a second communication unit 120, a storage 130, and a controller 140.

The first communication unit 110 and the second communication unit 120 are means for receiving data from an external source and transmitting data to the external source, and may be represented as logical combinations of one or more software and/or hardware modules, for example, a network interface card and the corresponding network driver interface specification (NDIS) stack. The first communication unit 110 may support various communication protocols. For example, the first communication unit 110 may support various mobile communication standards, such as advanced mobile phone system (AMPS), CDMA, GSM, WCDMA, high speed downlink packet access (HSDPA), LTE, LTE-advanced (A), etc., and may also support short-range network technologies including BLE and Zigbee. In addition, the first communication unit 110 may support wired communication standards including Ethernet, home phone-line networking alliance (PNA), power line communication (PLC), and so on.

Particularly, in the present invention, the first communication unit 110 may be connected to a first communication unit 110 of another first beacon device 100 in a tree topology, and may also be connected to the wireless AP device 300 to communicate with the service providing server device 400 through the communication network 500. Here, the first communication unit 110 may use wireless communication methods including WLAN, Wi-Fi, wireless broadband (WiBro), worldwide interoperability for microwave access (WiMax), HSDPA, and so on. However, wireless communication methods of the first communication unit 110 are not limited thereto, and it is also possible to use a wired communication method including Ethernet, digital subscriber line (xDSL; asymmetric DSL (ADSL) and very-high-bitrate DSL (VDSL)), hybrid fiber coaxial (HFC) cable, fiber to the curb (FTTC), fiber to the home (FTTH), etc. according to a system implementation method.

The second communication unit 120 exchanges signals and various types of data for maintaining a wireless connection with a second beacon device 200. Here, the second communication unit 120 may perform PAN-based communication including Bluetooth communication.

The storage 130 is a component for storing data or a program executed or processed by the controller 140. Basically, the storage 130 may store an OS for booting the first beacon device 100 and operating each of the components described above, an application program for performing a user function for supporting a distribution function of the first beacon device 100, and so on.

Particularly, in the present invention, information on another nearby first beacon device 100 or a second beacon device 200 according to the present invention may be registered in the storage 130. This information includes location information of each beacon device. The storage 130 includes magnetic media, such as a hard disk, a floppy disk, and a magnetic tape, optical media, such as a CD-ROM and a digital video disk (DVD), magneto-optical media, such as a floptical disk, and main memory devices and auxiliary memory devices, such as a ROM, a RAM, and a flash memory. The storage 130 may largely include a program region and a data region.

The controller 140 is a component which performs overall control of the first beacon device 100 and may be implemented by including at least one processor. The processor may be a single-threaded processor, and in another embodiment, the processor may be a multithreaded processor. Further, the controller 140 may operate by processing a command stored in the storage 130 through the at least one processor. Here, the command may include, for example, an interpretable command, such as a script command including a JavaScript or ECMAScript command, executable code, and other commands stored in a computer-readable medium.

Particularly, in the present invention, a computer-readable recording medium storing a program for carrying out the method of setting a wireless mesh network according to the present invention may be stored in the storage 130 and loaded and executed by the controller 140.

When the method of setting a wireless mesh network according to the present invention is carried out, the controller 140 controls the first beacon device 100 to allocate one of preset usable frequencies and allocate a time slot for the usable frequency to the second beacon device 200.

Thus far, the first beacon device 100 according to an embodiment of the present invention has been described.

A main configuration and an operation method of a second beacon device 200 according to an embodiment of the present invention will be described below.

Figure 7:
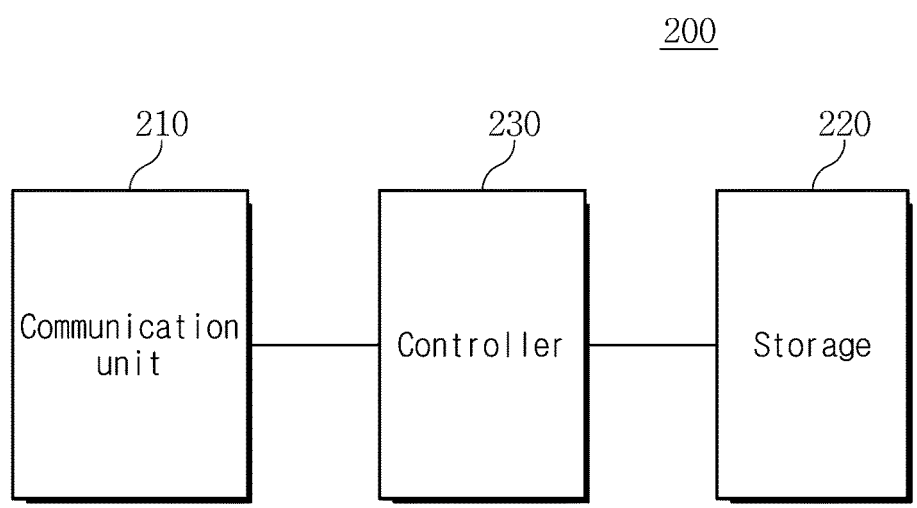
FIG. 7 is a block diagram showing a structure of a second beacon device which carries out the method of setting a wireless mesh network according to an embodiment of the present invention.

FIG. 7 is a block diagram showing a structure of a second beacon device which carries out the method of setting a wireless mesh network according to an embodiment of the present invention.

Referring to FIG. 7, a second beacon device 200 which carries out the method of setting a wireless mesh network according to an embodiment of the present invention may include a communication unit 210, a storage 220, and a controller 230.

Like the communication units of the first beacon device 100, the communication unit 210 is a means for receiving data from an external source and transmitting data to the external source, and may be represented as a logical combination of one or more software and/or hardware modules, for example, a network interface card and the corresponding NDIS stack.

Particularly, in the present invention, the communication unit 210 periodically or aperiodically exchanges signals and various types of data for maintaining a wireless connection with a first beacon device 100. Here, the communication unit 210 may perform PAN-based communication including Bluetooth communication.

The storage 220 is a component for storing data or a program executed or processed by the controller 230. Basically, the storage 220 may store an OS for booting the second beacon device 200 and operating each component described above, an application program for performing a user function for supporting a distribution function of the second beacon device 200, and so on. The storage 220 includes magnetic media, such as a hard disk, a floppy disk, and a magnetic tape, optical media, such as a CD-ROM and a DVD, magneto-optical media, such as a floptical disk, and main memory devices and auxiliary memory devices, such as a ROM, a RAM, and a flash memory. The storage 220 may largely include a program region and a data region and store application programs necessary for functional operations of the second beacon device 200. When activating each function in response to the user's request, the second beacon device 200 provides each function by executing the corresponding application program under control of the controller 230.

The controller 230 is a component for performing overall control of the second beacon device 200 and may be implemented by including at least one processor. The processor may be a single-threaded processor, and in another embodiment, the processor may be a multithreaded processor. Further, the controller 230 may operate by processing a command stored in the storage 220 through the at least one processor. Here, the command may include, for example, an interpretable command, such as a script command including a JavaScript or ECMAScript command, executable code, and other commands stored in a computer-readable medium.

Thus far, the second beacon device 200 according to an embodiment of the present invention has been described.

Detailed operations of the first beacon device 100 and the second beacon device 200 according to embodiments of the present invention may be clearly understood through flowcharts described below.

The method of setting a wireless mesh network according to an embodiment of the present invention will now be described with reference to FIGS. 8 and 9.

Figure 8:
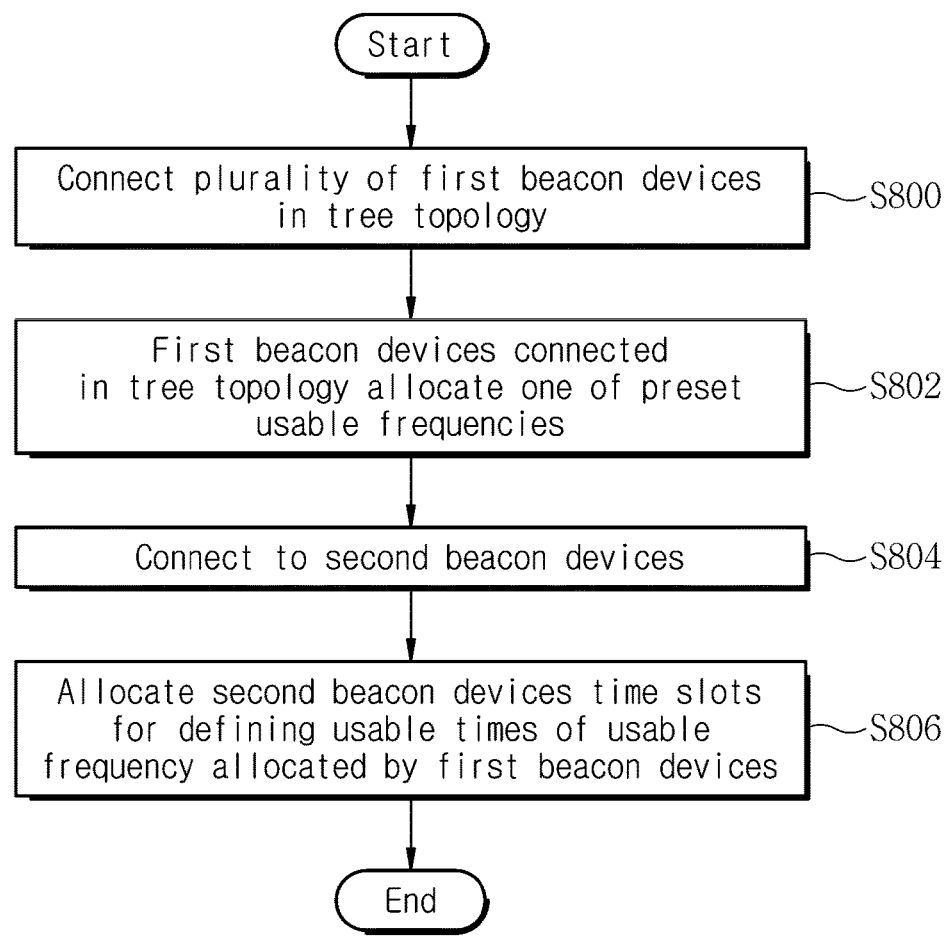
FIG. 8 is a flowchart illustrating an operation of a first beacon device which carries out the method of setting a wireless mesh network according to an embodiment of the present invention.

FIG. 8 is a flowchart illustrating operation of a first beacon device which carries out the method of setting a wireless mesh network according to an embodiment of the present invention.

First, a first beacon device 100 is connected to other first beacon devices 100 in a tree topology (S800).

Subsequently, the first beacon device 100 connected in the tree topology allocates one of preset usable frequencies (S802). At this time, usable frequencies of other first beacon devices 100 corresponding to a parent node, a sibling node, and a child node of each of the first beacon devices 100 are checked, and the usable frequency of each of the first beacon devices 100 may be allocated so as not to overlap the usable frequencies of other first beacon devices 100.

Before, after, or during the allocation process, the first beacon device 100 may be connected to one or more second beacon devices 200 (S804). At this time, the first beacon device 100 and the second beacon devices 200 may be connected in a star topology.

When the one or more second beacon devices 200 are connected, time slots for defining usable times of the usable frequency allocated by the first beacon device 100 are allocated (S806). As for a method of allocating time slots, it is possible to divide a preset whole time slot according to the number of the connected second beacon devices 200 and allocate an individual time slot to each of the second beacon devices 200, to set individual time slots of the connected second beacon devices 200 in advance and allocate the whole time slot according to the number of the connected second beacon devices 200, or to collect traffic information of the connected second beacon devices 200 and allocate individual time slots of the connected second beacon devices 200 based on the traffic information. In addition, it is possible to allocate an idle time slot between individual time slots of the connected second beacon devices 200.

Figure 9:
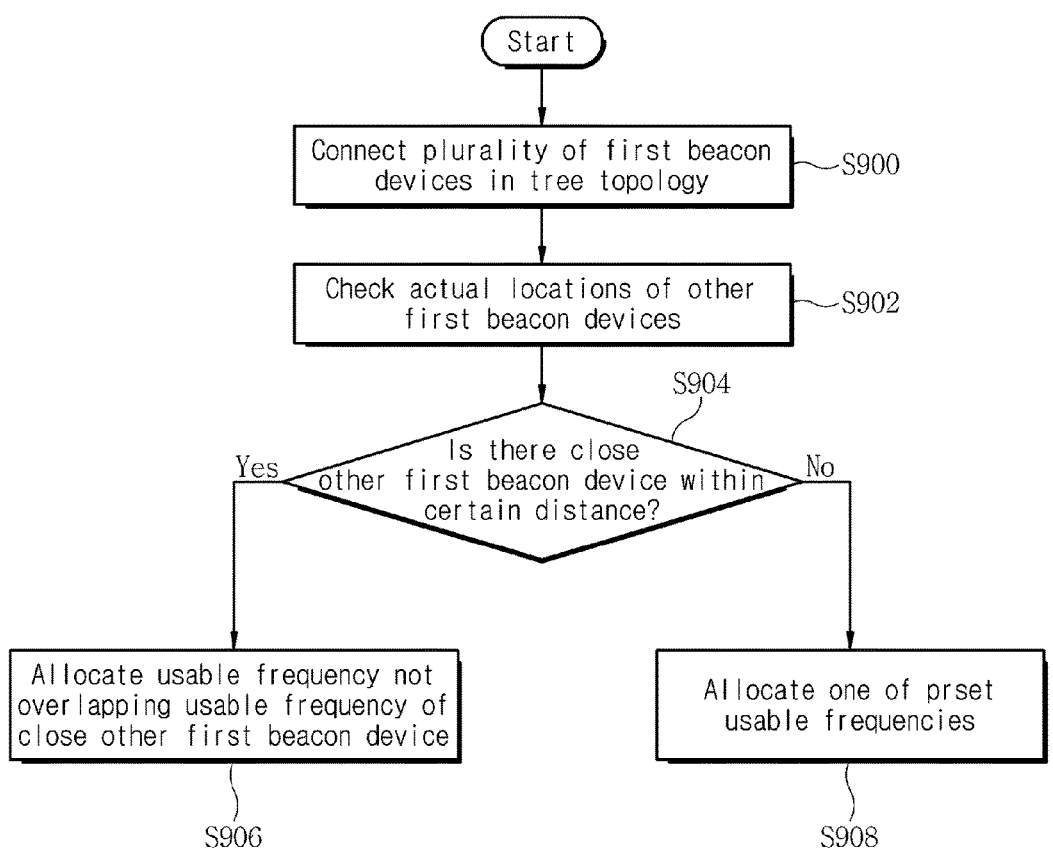
FIG. 9 is a flowchart illustrating an operation of a first beacon device which carries out the method of setting a wireless mesh network according to an embodiment of the present invention by considering the locations of first beacon devices.

FIG. 9 is a flowchart illustrating operation of a first beacon device which carries out the method of setting a wireless mesh network according to an embodiment of the present invention by considering the locations of first beacon devices.

Referring to FIG. 9, a first beacon device 100 is connected to other first beacon devices 100 in a tree topology (S900).

Subsequently, the first beacon device 100 connected in the tree topology allocates one of preset usable frequencies. At this time, like in the embodiment of FIG. 8, it is necessary to check usable frequencies of other first beacon devices 100 corresponding to a parent node, a sibling node, and a child node of each of the first beacon devices 100 and allocate the usable frequency of the first beacon device 100 so as to not overlap the usable frequencies of the other first beacon devices 100.

Also, the first beacon device 100 may additionally check the actual locations of the other first beacon devices 100 (S902). When it is checked that there is a close first beacon device 100 within a certain distance range (S904), the first beacon device 100 allocates a usable frequency which does not overlap the usable frequency of the close first beacon device 100 (S906). When there is no close first beacon device 100, like in the embodiment of FIG. 8, usable frequencies of other first beacon devices 100 corresponding to a parent node, a sibling node, and a child node of each of the first beacon devices 100 are checked, and one of the preset usable frequencies may be allocated as the usable frequency of each of the first beacon devices 100 so as not to overlap the usable frequencies of the other first beacon devices 100 (S908).

Thus far, the method of setting a wireless mesh network according to an embodiment of the present invention has been described.

The program stored in the recording medium may be read, installed, and executed by a computer, so that the above-described functions may be performed.

Here, in order for a computer to read the program stored in the recording medium and perform the functions implemented in the program, the aforementioned program may include code written in computer languages including C, C++, Java, a machine language, etc. which are readable by a processor (a central processing unit (CPU)) of the computer through an interface of the computer.

The code may include function code related to functions for defining the above-described functions, and may also include execution procedure-related control code which is necessary for the processor of the computer to perform the functions according to a certain procedure. Also, the code may further include additional information necessary for the processor of the computer to perform the above-described functions or memory reference-related code regarding a location (an address) in an internal or external memory that media refer to.

In addition when the processor of the computer requires communication with another computer, a server, etc. at a remote place to perform the above-described functions, the code may further include communication related code regarding how the processor of the computer communicates with which computer, server, etc. at the remote place using a communication module of the computer and what kind of information or media the processor of the computer transmits or receives during communication.

Computer-readable media suitable to store computer program commands and data, for example, recording media, include magnetic media, such as a hard disk, a floppy disk, and a magnetic tape, optical media, such as a CD-ROM and a DVD, magneto-optical media, such as a floptical disk, and semiconductor memories, such as a ROM, a RAM, a flash memory, an EPROM, and an electrically erasable programmable ROM (EEPROM). The processor and the memories may be supplemented by or integrated into a special-purpose logical circuit.

The computer-readable recording media may be distributed to a computer system connected through a network, and computer-readable code may be stored and implemented in a distributed manner. A functional program for implementing the present invention, relevant code, and code segments may be readily inferred or modified by programmers skilled in the art to which the present invention pertains in view of a system configuration of the computer that reads the recording media to execute the program.

Each operation according to such embodiments of the present invention may be implemented as computer-executable instructions and executed by a computer system. Here, the term "computer system" is defined as one or more software modules, one or more hardware modules, or a combination of them which operate when performing an operation on electronic data. For example, the definition of a computer system includes a software module such as an OS of a PC and hardware components of the PC. The physical layout of a module is of little importance. The computer system may include one or more computers connected through a network.

Likewise, the computing system may be implemented as one physical device in which internal modules including a memory and a processor operate when performing an operation on electronic data.

In other words, an apparatus for carrying out the method of setting a wireless mesh network according to the present invention may be implemented to perform the above-described embodiments based on a computer system described below.

Figure 10:
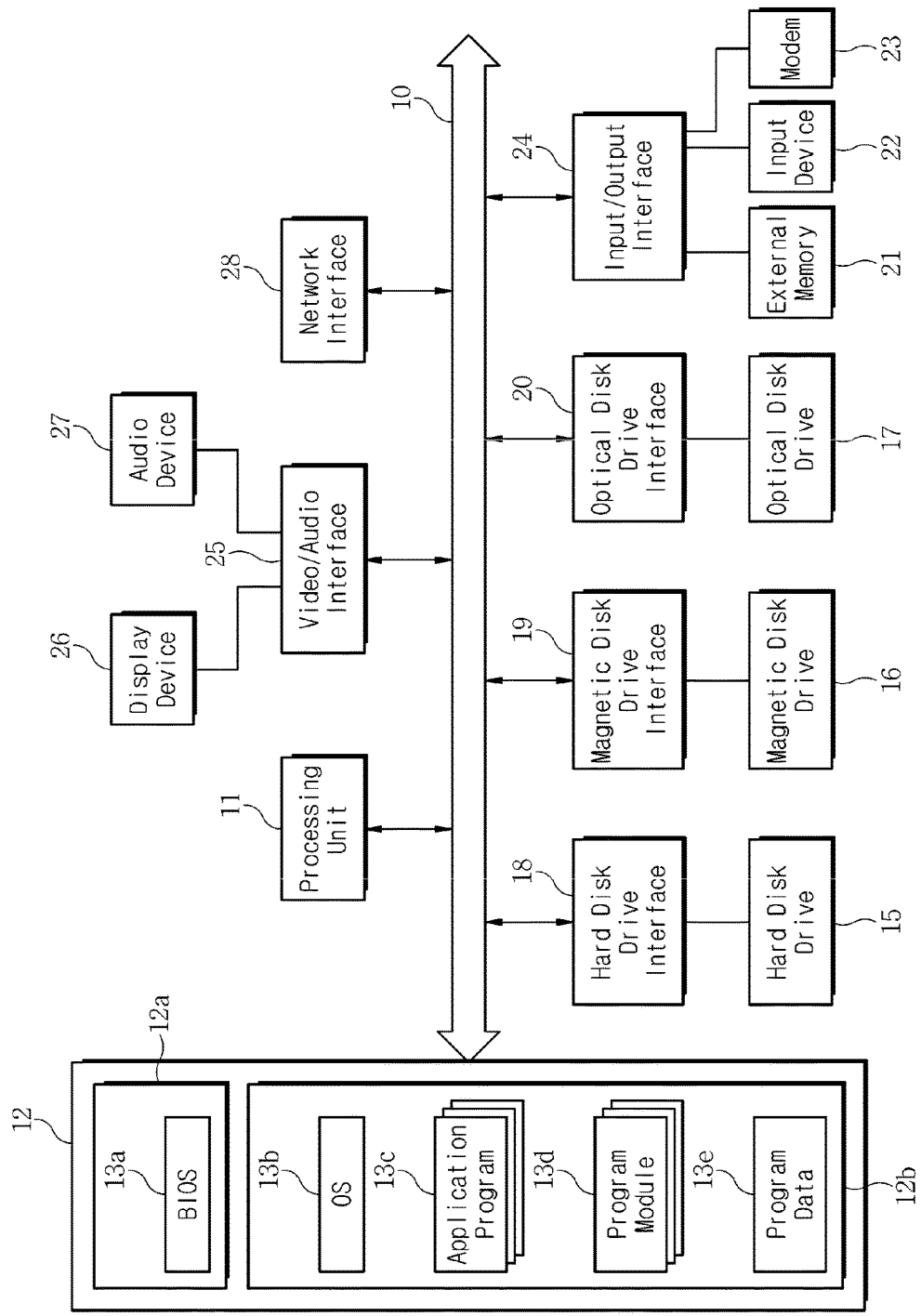
FIG. 10 is a diagram showing an operating environment of an apparatus for carrying out the method of setting a wireless mesh network according to an embodiment of the present invention.

FIG. 10 is a diagram showing an operating environment of an apparatus for carrying out the method of setting a wireless mesh network according to an embodiment of the present invention. In other words, FIG. 10 is a diagram illustrating an operating environment of the first beacon devices 100 or the second beacon devices 200.

An appropriate computing environment in which the present invention may be embodied will be described simply and generally with reference to FIG. 10. It is not required but possible to describe the present invention in connection with computer-executable instructions, such as program modules executed by a computer system.

In general, a program module includes a routine, a program, an object, a component, a data structure, etc. for performing a particular task or implementing a particular abstract data type. Computer-executable instructions, relevant data structures, and program modules are examples of program code means for performing operations of the present invention disclosed herein.

Referring to FIG. 10, an exemplary computer system for implementing the present invention includes a computing device including a processing unit 11, a system memory 12, and a system bus 10 which connects various system components including the system memory 12 to the processing unit 11.

The processing unit 11 may execute computer-executable instructions designed to implement characteristics of the present invention.

The system bus 10 may be a local bus, a peripheral bus, and a memory bus which use any of various bus architectures, or any of some types of bus structures including a memory controller. The system memory 12 includes a ROM 12a and a RAM 12b. A basic input/output system (BIOS) 13a including a basic routine which helps to transmit information between the components of the computer system during boot-up etc. may be generally stored in the ROM 12a.

The computer system may include a storage means, for example, a hard disk drive 15 which reads information from a hard disk or records information in the hard disk, a magnetic disk drive 16 which reads information from a magnetic disk or records information in the magnetic disk, and an optical disk drive 17 which reads information from an optical disk, such as a CD-ROM or other optical media, or records information in the optical disk. The hard disk drive 15, the magnetic disk drive 16, and the optical disk drive 17 are connected to the system bus 10 through a hard disk drive interface 18, a magnetic disk drive interface 19, and an optical drive interface 20, respectively.

Also, the computer system may further include an external memory 21 as a storage means. The external memory 21 may be connected to the system bus 10 through an I/O interface 24.

The above-described drives and relevant computer-readable media on which reading and recording is performed by the drives provide non-volatile storage of computer-executable instructions, data structures, program modules, and other data. Although the exemplary environment described herein shows the hard disk 15, the magnetic disk 16, and the optical disk 17 as examples, additionally, it is possible to use other types of computer-readable media for storing data including a magnetic cassette, a flash memory card, a DVD, a Bernoulli cartridge, a RAM, a ROM, and so on.

Program code means including one or more program modules including an OS 13b, one or more application programs 13c, other program modules 13d, and program data 13e which are loaded and executed by the processing unit 11 may be stored in the hard disk 15, the magnetic disk 16, the optical disk 17, the ROM 12a, or the RAM 12b.

Also, the computer system may receive a command and information from a user through an input device 22 such as a keyboard, a pointing device, a microphone, a joystick, a game pad, a scanner, and so on. This input device 22 may be connected to the processing unit 11 through the I/O interface 24 connected to the system bus 10. The I/O interface 24, for example, may logically represent not only any of a wide variety of different interfaces, such as a serial port interface, a personal system 2 (PS/2) interface, a parallel port interface, a universal serial bus (USB) interface, and an Institute of Electrical and Electronics Engineers (IEEE) 1394 interface (i.e., a FireWire interface), but also a combination of different interfaces.

In addition, the computer system to which the present invention is applied may further include a display device 26, such as a monitor or a liquid crystal display (LCD), and an audio device 27, such as a speaker or a microphone. These are connected to the system bus 10 through a video/audio interface 25. For example, other peripheral output devices (not shown), such as a speaker and a printer, may be connected to the computer system. The video/audio interface 25 may include a high definition multimedia interface (HDMI), a graphics device interface (GDI), and so on.

Further, the computer system for performing the present invention may be connected to a network, such as an office- or enterprise-wide area computer network, a home network, an intranet, and/or the Internet. Through these networks, the computer system may exchange data with external sources, such as a remote computer system, a remote application, and/or a remote database.

To this end, the computer system to which the present invention is applied includes a network interface 28 which receives data from an external source and/or transmits data to the external source.

In the present invention, the computer system may exchange information with a device at a remote place through the network interface 28. For example, when the computer system denotes a first beacon device 100, it is possible to exchange information with the service providing server device 400 through the network interface 28. On the other hand, when the computer system denotes the service providing server device 400, it is possible to exchange information with a first beacon device 100 through the network interface 28. The network interface 28 may be represented by a logical combination of one or more software and/or hardware modules, such as a network interface card and the corresponding NDIS stack.

Likewise, the computer system receives data from an external source or transmits data to the external source through the I/O interface 24. The I/O interface 24 may be connected to a modem 23 (e.g., a standard modem, a cable modem, or a DSL modem), and may receive data from an external source and/or transmit data to the external source through the modem 23.

Although FIG. 10 shows an operating environment appropriate for the present invention, the principles of the present invention may be employed by any system which implements the principles after appropriate modification as necessary. The environment shown in FIG. 10 is merely an example and represents only one of a wide variety of environments in which the principles of the present invention may be implemented.

Also, various types of information generated during execution of a wireless network setting program of the present invention may be stored and accessed in an arbitrary computer-readable medium related to a computer system as shown in FIG. 10. For example, some of such program modules and some of relevant program data may be included in the OS 13*b*, the application programs 13*c*, the program modules 13*d*, and/or the program data 13*e* to be stored in the system memory 12.

When a mass storage device such as a hard disk is connected to the computer system, such program modules and relevant program data may be stored in the mass storage device. In a network environment, all or some of program modules related to the present invention may be stored in a system memory related to a remote computer system, for example, a computer system of the first beacon devices 100 and the service providing server device 400, connected through the modem 23 of the I/O interface 24 or the network interface 28 and/or a remote memory storage device such as a mass storage device. As mentioned above, such modules may be executed in a distributed system environment.

As described above, this specification includes many particular implementation details. These particular implementation details are not meant to be construed as limitations on the scope of the invention or of what may be claimed, but rather as descriptions of features specific to particular embodiments of the invention. Certain features described in the context of separate embodiments may also be combined and implemented as a single embodiment.

Conversely, various features described in the context of a single embodiment can also be implemented in multiple embodiments separately or in any suitable sub-combinations. Moreover, although features may be described as acting in particular combinations and even initially claimed as such, one or more features from a combination as described or a claimed combination may in some cases be excluded from the combination, and the claimed combination may be directed to a sub-combination or a variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable those of ordinary skill in the art to implement and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the invention.

Consequently, the scope of the present invention should be determined by the claims rather than the described embodiments.

What is claimed is:

1. A first beacon device comprising:
   a first communication unit configured to communicate with one or more other first beacon devices in a tree topology;
   a second communication unit configured to communicate with one or more second beacon devices, wherein the second beacon devices are designated within a different level in the tree topology from the first beacon devices; and
   a controller configured to control transmission of a beacon signal by:
      allocating a respective usable frequency as a communication channel for each of the one or more other first beacon devices; and
      allocating, within a preset usable frequency that is different from the respective usable frequencies allocated to the one or more other first beacon devices, a time slot to each of the one or more second beacon devices for defining usable times during which a respective second beacon device communicates with the one or more other first beacon devices through the preset usable frequency, wherein the time slot lasts for a predetermined length of time; and wherein the controller is configured to check usable frequencies for each different first beacon device corresponding to a parent node, a sibling node, and a child node, and allocate the respective usable frequencies to the each different first beacon devices so as not to overlap the usable frequencies of the other first beacon devices.

2. The first beacon device of claim 1, wherein the second communication unit is configured to communicate with the one or more second beacon devices in a star topology.

3. The first beacon device of claim 1, wherein the controller is further configured to:
check actual locations of the each different first beacon devices;
determine whether the each different first beacon devices are close to other first beacon devices within a certain distance range; and
allocate the respective usable frequency so as not to overlap usable frequencies of the other first beacon devices determined to be within the certain distance range.

4. The first beacon device of claim 1, wherein the first communication unit is configured to communicate with the one or more other first beacon devices using a first wireless communication method, and
the second communication unit is configured to communicate with the one or more second beacon devices using a second communication method different from the first wireless communication method.

5. The first beacon device of claim 1, wherein the usable times comprises a preset whole time slot; and
wherein the controller is configured to divide the preset whole time slot according to a number of the second beacon devices in communication with the second communication unit, and allocate individual time slots to each of the second beacon devices in communication with the second communication unit.

6. The first beacon device of claim 1, wherein the controller is further configured to:
set individual time slots for the second beacon devices in communication with the second communication unit in advance; and
allocate all the time slots according to a number of the second beacon devices in communication with the second communication unit.

7. The first beacon device of claim 1, wherein the controller is further configured to collect traffic information of the connected second beacon devices and allocates individual time slots to each of the second beacon devices based on the traffic information.

8. The first beacon device of claim 1, wherein the controller is further configured to allocate an idle time slot between individual time slots of the second beacon devices in communication with the second communication unit.

9. A non-transitory computer-readable recording medium storing a program for executing a method for setting a wireless mesh network, the program, when executed by a first beacon device, causes the first beacon device to:
communicate with a plurality of first beacon devices in a tree topology;
allocate a respective usable frequency as a communication channel for each of the plurality of first beacon devices;
connect one or more second beacon devices to at least one of the plurality of first beacon devices, wherein the second beacon devices are designated within a different level in the tree topology from the first beacon devices; and
allocate, within a preset usable frequency that is different from the respective usable frequencies allocated to the one or more first beacon devices, a time slot to each of the one or more second beacon devices for defining usable times during which a respective second beacon device communicates with the one or more first beacon devices through the preset usable frequency, wherein the time slot lasts for a predetermined length of time; and
allocate the respective usable frequencies by checking usable frequencies of different first beacon devices corresponding to a parent node, a sibling node, and a child node of each of the first beacon devices, and allocate the respective usable frequencies to the different first beacon devices so as not to overlap the usable frequencies of the first beacon devices.

10. The non-transitory computer-readable recording medium of claim 9, wherein the program, when executed by the first beacon device, causes the first beacon device to allocate the plurality of preset usable frequencies by further:
checking actual locations of the plurality of different first beacon devices;
determining whether the different first beacon devices are close to other first beacon devices within a certain distance range from each first beacon device; and
allocating the respective usable frequency so as not to overlap usable frequencies of the other first beacon devices determined to be within the certain distance range.

11. The non-transitory computer-readable recording medium of claim 9, wherein the program, when executed by the first beacon device, causes the first beacon device to allocate the time slots by dividing a preset whole time slot according to a number of connected second beacon devices, and allocating individual time slots to each of the connected second beacon devices.

12. The non-transitory computer-readable recording medium of claim 9, wherein the program, when executed by the first beacon device, causes the first beacon device to allocate the time slots by setting individual time slots of the connected second beacon devices in advance, and allocating all the time slots according to a number of the connected second beacon devices.

13. The non-transitory computer-readable recording medium of claim 9, wherein the program, when executed by the first beacon device, causes the first beacon device to allocate the time slots by collecting traffic information of the connected second beacon devices, and allocating individual time slots to each of the connected second beacon devices based on the traffic information.

14. The non-transitory computer-readable recording medium of claim 9, wherein the program, when executed by the first beacon device, causes the first beacon device to allocate the time slots by allocating an idle time slot between individual time slots of the connected second beacon devices.

15. A method of setting a wireless mesh network, performed by a first beacon device, the method comprising:

communicating with a plurality of first beacon devices in a tree topology;

allocating a respective usable frequency as a communication channel for each of the plurality of first beacon devices;

connecting one or more second beacon devices to at least one of the plurality of first beacon devices, wherein the second beacon devices are designated within a different level in the tree topology from the first beacon devices; and allocating, within a preset usable frequency that is different from the respective usable frequencies allocated to the one or more first beacon devices, a time slot to each of the one or more second beacon devices for defining usable times during which a respective second beacon device communicates with the one or more first beacon devices through the preset usable frequency, wherein the time slot lasts for a predetermined length of time; and wherein the allocating of the respective usable frequencies includes checking usable frequencies of different first beacon devices corresponding to a parent node, a sibling node, and a child node of each of the first beacon devices, and allocating the respective usable frequency to each first beacon device so as not to overlap the usable frequencies of the different first beacon devices.

16. The method of claim 15, wherein the allocating of the plurality of preset usable frequencies includes:

checking actual locations of the plurality of different first beacon devices;

determining whether the different first beacon devices are close to other first beacon devices within a certain distance range from each first beacon device; and allocating a usable frequency so as not to overlap usable frequencies of the other first beacon devices determined to be within the certain distance range.

* * * * *